Patented Feb. 17, 1948

2,436,243

UNITED STATES PATENT OFFICE 2,436,243

PURIFICATION OF ORGANIC NITROSATION-SULFITATION PRODUCTS

Leland James Beckham, Chesterfield County, Va., assignor to Allied Chemical & Dye Corporation, a corporation of New York No Drawing. Application December 22, 1945, Serial No. 637,068

13 Claims. (Cl. 260—513)

This invention relates to a process for purifying a surface-active nitrosation-sulfitation product, i. e., a composition obtained by reacting an unsaturated organic compound or mixture of compounds containing a non-aromatic

linkage with a nitrosating agent (a nitrosyl halide, or nitrogen trioxide or tetroxide) and reacting the resulting nitrosation product with an aqueous solution of a water-soluble sulfite.

Preparation of nitrosation-sulfitation products having surface-active properties has been disclosed in a number of prior patents. Thus U. S. Patent 2,265,993 of L. J. Beckham, describes manufacture of surface-active compositions by reacting nitrosyl halides (i. e., nitrosyl chloride or nitrosyl bromide) with olefins or a mixture of olefins containing 10 to 30 carbon atoms, and reacting the resulting nitrosation products with an aqueous solution of a water-soluble sulfite. The resulting surface-active composition comprises as its principal components, sulfonated ketones, sulfonated amines, sulfonated alkylidene sulfamates, sulfonated alkyl sulfamates and bisulfite addition products of sulfonated alkylidene sulfamates. Compositions derived from olefins having 10 to 30 carbon atoms are said to be especially valuable as detergents, and as wetting, dispersing and emulsifying agents.

U. S. Patent 2,336,387 of L. J. Beckham discloses similar manufacture of surface-active compositions by forming nitrosyl halide addition products of substituted unsaturated (i. e., olefinic) hydrocarbons containing at least one carboxylic substituent (including carboxylic acid radicals, carboxylic ester radicals, salt radicals, amide radicals, acid halide radicals and nitrile radicals), and reacting the resulting addition products with an aqueous solution of a water-soluble sulfite. The compositions obtained comprise mixtures of sulfonates and sulfamates as set out above, containing a carboxylic substituent and combining in their properties the characteristics of the carboxylic radical with those of the solubilizing groups introduced by nitrosation and sulfitation. Compositions thus prepared from the aforesaid substituted unsaturated hydrocarbons of 10 to 30 carbon atoms are said to be especially satisfactory as detergents.

Moreover, as disclosed in U. S. Patent 2,313,719 to Beckham, surface-active nitrosation-sulfitation products, similar to those obtained according to the aforesaid patents, can be prepared from corresponding unsaturated starting materials by reaction with nitrogen trioxide or tetroxide to form an addition product (mainly composed of nitroso-nitrites or nitroso-nitrates), and sulfitation of the latter by reaction with an aqueous sulfite solution. Surface-active compositions are likewise obtained by this process principally from compounds containing 10 to 30 carbon atoms per ethylenic group.

Surface-active nitrosation-sulfitation products can also be prepared by processes similar to those of the foregoing patents, employing mixtures of the various nitrosating agents disclosed therein, for example, nitrosyl chloride containing about 5% of nitrogen tetroxide.

The sulfitation mixtures prepared according to the aforesaid patents contain, in addition to the resulting surface-active reaction products, incompletely reacted raw materials or intermediates, and by-products of the reactions involved in the process. Thus, the mixtures contain water-insoluble (particularly oily) substances corresponding to the unreacted or unreactive components of the unsaturated starting material, or by-products formed during nitrosation thereof. These impurities can be removed by decantation and extraction, e. g., with a low-boiling non-aromatic hydrocarbon solvent, as described in application Serial No. 427,321 of Fessler (now U. S. Patent 2,383,120), followed by distillation of the extraction solvent from the aqueous solution, e. g., as described in application Serial No. 434,578 of Fessler (now U. S. Patent 2,381,658).

Moreover, the aforesaid aqueous sulfitation mixtures contain substantial amounts of inorganic salts comprising, in addition to sulfites (which are employed in the sulfitation mixture in an amount exceeding that required for the reaction), halides and sulfates formed as a result of the sulfitation reaction. Such salts are generally beneficial to the surface-active properties of the composition, but are sometimes objectionable for other reasons which render their removal desirable. For example, the sulfites, because of their reducing properties, are incompatible with oxidizing agents sometimes incorporated in surface-active compositions, and hinder the use of the compositions in strongly acid solutions by reason of liberation of $SO_2$. The presence of inorganic salts in the composition is also undesirable when it is desired to substitute some other salt as an ingredient, e. g., a phosphate or borate, or to prepare liquid compositions for distribution, containing organic solvents in which the inorganic salts are insoluble. Thus, the removal of inorganic salts from nitrosation-sulfitation products is desirable in order to provide compositions which are soluble in organic solvents such as trichloroethylene or ortho-dichlorobenzene, solutions of the products in such solvents being highly effective for some cleaning purposes. In addition, for shipping purposes, the salts constitute an added burden with consequent increase in expense.

The sulfitation products also contain highly water-soluble organic reaction products which are characterized by low surface activity and hence low effectiveness as detergents, and which include colored impurities, causing serious discoloration of the final product. These compounds include nitrosation-sulfitation products of fractions of the unsaturated raw materials (when mixtures of unsaturated compounds are employed) having too low a molecular weight to contribute toward surface-activity, and decomposition products, formed by scission of molecules of the raw materials (e. g., during nitrosation) which are rendered water-soluble by sulfitation. Removal of these materials from the sulfitation mixture is highly desirable, in order to improve the marketability of the product and to avoid discoloration of materials treated therewith.

Purification of surface-active nitrosation sulfitation products so as to remove inorganic salts, water-soluble organic compounds of poor surface activity, and colored impurities presents a particularly difficult problem in view of the heterogeneous nature of the organic components of the compositions. For example, the ketone- and amine-sulfonates generally contain only one sulfonate group per molecule, the sulfonated alkyl and alkylidene sulfamates contain two sulfonate groups, and the bisulfite addition products of alkylidene sulfamates contain three sulfonate groups. The solubility of the individual compounds in water as well as other solvents varies greatly depending upon the structure of the solubilizing groups and the number of groups per molecule. Accordingly, even in the case of nitrosation-sulfitation products prepared from a single olefin, methods for separating the organic surface-active components from other soluble components of the composition, based on differences in solubility are generally ineffective to remove undesired components without at the same time removing substantial portions of the desired surface-active components. In this respect, nitrosation-sulfitation products are distinguished from other surface-active compositions wherein the solubilizing groups in the individual components are of the same type and number.

The difficulty in purifying nitrosation-sulfitation products, arising from the wide range of properties caused by differences in the solubilizing groups of the components of such compositions is further complicated when this divergence in properties is increased by differences in structure and molecular weight of the hydrocarbon radicals of the individual components, as for example, when the nitrosation-sulfitation product is derived from a mixture of unsaturated compounds such as an olefinic hydrocarbon mixture of the petroleum type. Even when the mixture has a relatively narrow range of molecular weight, e. g., when employing an olefinic petroleum fraction of 14 to 23 carbon atoms, the divergence in structure of individual organic components is extreme, as illustrated by the carbon content per molecule which, in such a composition, varies from about 32 to 64%.

A further difficulty encountered in purifying nitrosation-sulfitation products, particularly in separating them from inorganic salts, arises from the fact that the organic constituents as a whole are very soluble in water exceeding in this respect the solubility of inorganic salts such as NaCl, $Na_2SO_3$, and $Na_2SO_4$ ordinarily associated therewith. This property also distinguishes the nitrosation-sulfitation products from other types of surface-active agents, which are generally much less soluble in water than the aforesaid inorganic salts.

Thus, physical methods of purification commonly employed for other surface-active compositions have been found inadequate or impractical in the case of surface-active nitrosation-sulfitation products. For example, concentration of the solutions and cooling to remove inorganic salts by fractional crystallization is effective to remove only about 25% of the sodium sulfite, corresponding to about 9 to 10% of the total amount of inorganic salts normally present; extraction of the aqueous solutions with non-polar hydrocarbon solvents fails to effect a separation because of the highly water-soluble nature of the surface-active components, while aromatic hydrocarbons extract only a small fraction of the surface-active materials; evaporation of the aqueous solutions to dryness and attempted extraction of the solids with solvents such as chloroform, toluene, or isopropyl alcohol results in formation of a solution of part of the surface-active components in the solvent, but other components swell without dissolving, rendering filtration or other separation of the insoluble materials from the solution impractical; and dialysis effects separation but results in inordinate dilution of the organic materials, and diffusion losses.

I have now discovered that surface-active nitrosation-sulfitation products obtained from an unsaturated organic compound of 10 to 30 carbon atoms, having a non-aromatic

linkage (including mixtures of such compounds, especially olefinic hydrocarbon mixtures, e. g., of the petroleum type) can be purified so as to remove not only inorganic salts but also relatively inactive and highly colored organic impurities, while recovering the surface-active materials in high yields, by the process of my invention, which involves mixing an aqueous solution of the nitrosation-sulfitation product with a solvent containing at least 50% of a monohydric alcohol of 3 to 5 carbon atoms, said solvent being incompletely miscible with said solution and employed in an amount sufficient to cause separation of two liquid phases, one of which constitutes a predominantly aqueous phase and the other an alcohol-rich phase, separating the aqueous phase from the alcohol-rich phase and recovering the nitrosation-sulfitation products dissolved in the latter phase.

The effectiveness of the process of the invention in removing inorganic salts and undesirable impurities from nitrosation-sulfitation products, and the recovery of the surface-active components of the compositions in high yields is surprising and unexpected. Thus, it could not have been foreseen, in view of the heterogeneous nature of the surface-active organic components, and their solubility in water, that they could be separated from inorganic salts and recovered in high yield by simple treatment with an alcoholic solvent. On the contrary, the fact that the organic nitrosation-sulfitation products are more soluble in water than the inorganic salts associated therewith, would suggest that the organic components would remain largely in the aqueous phase, together with the inorganic salts, or would have migrated from the aqueous phase only if inorganic salts also migrated from the aqueous to the alcohol-rich phase.

While the process of the invention can be carried out as a batch process, it is especially adapted for use as a counter-current extraction process. In this form it involves introduction of an aqueous solution of the nitrosation-sulfitation product into an extraction column at the upper end of the countercurrent zone, and introduction of the alcoholic solvent at the base of said zone, allowing the liquids to flow in countercurrent relation through the column, and withdrawing the alcohol-rich phase containing the surface-active materials from the top, and the aqueous phase containing salts and impurities from the bottom of the column. The countercurrent zone is preferably provided with packing adapted to insure intimate contact between the counter-flowing liquids. The column can be adjusted to operate with either liquid as the continuous phase, by maintaining the phase boundary above or below the counter-current zone, however, no substantial difference in result is observed as between these two modes of operation.

Despite the complexity of the surface-active nitrosation-sulfitation products, the process of this invention effects separation of inorganic salts from the surface-active components of the mixtures and can be operated so as to provide a high yield of the surface-active materials substantially free of inorganic salts by a single countercurrent extraction. Moreover, water-soluble organic impurities which do not contribute substantially to the surface-activity of the composition and colored impurities are removed so that the color of the surface-active composition is greatly improved.

The surface-active nitrosation-sulfitation products purified according to the invention are preferably obtained from olefinic hydrocarbon mixtures, particularly of the petroleum type, containing 10 to 30 carbon atoms per molecule, and especially those containing 14 to 23 carbon atoms per molecule.

The process of this invention is especially advantageous for the treatment of nitrosation-sulfitation products derived from olefinic petroleum type hydrocarbon mixtures in which the olefins contain from 14 to 23 carbon atoms, since removal of the organic impurities is particularly effective in the case of such compositions.

By olefinic hydrocarbon mixtures of the petroleum type, I mean olefinic mixtures derived from natural or synthetic petroleum or other mineral oils, e. g., by cracking, catalytic dehydrogenation, successive halogenation and dehydrohalogenation, or successive oxidation and reduction to form alcohols which are then dehydrated; and in addition synthetic olefinic hydrocarbon mixtures resembling the mixtures derived from petroleum, obtained for example by catalytic reduction of carbon oxides (Fisher-Tropsch synthesis), dehydration of the higher alcohols obtained thereby, or polymerization of lower olefins, e. g., isobutylene. Other olefinic hydrocarbon mixtures can be obtained, for example, by dehydrating alcohols prepared by hydrogenation of naturally occurring fats and oils such as tallow, palm oil, cocoanut oil, olive oil, or the corresponding free acids.

The olefinic hydrocarbon mixture may contain straight chain or branched chain compounds, and may contain one or two (but especially one) non-aromatic

linkages per molecule, either in a terminal or in an intermediate position in the molecule. The non-olefinic hydrocarbons may remain in the compositions during nitrosation and subsequent sulfitation, and are separated, prior to the purification in accordance with this invention, e. g., by decantation.

While olefinic hydrocarbon mixtures are generally employed, individual olefins can also be used as raw materials; for example, cetene, derived from spermaceti (comprising for the most part cetene-1), 2-methyl-undecene-2, dodecene-1, pentadecene-7, tricosene-11, nondecene-9, and 10-methyl-nondecene-9.

The nitrosation-sulfitation products subjected to the process of this invention also include those prepared from unsaturated organic compounds or substituted olefins of 10 to 30 carbon atoms, and preferably 14 to 23 carbon atoms. Suitable substituted olefins include esters of unsaturated fatty acids such as acrylic or oleic acid esters, mono and diesters of maleic acid with a saturated alcohol; esters of saturated fatty acids with an unsaturated alcohol, such as allyl alcohol and its homologs; free oleic or alkenyl succinic acids, their alkali metal salts, or acid chlorides; amides of unsaturated fatty acids, and amides of saturated fatty acids with unsaturated amines; and unsaturated ketones.

The nitrosation-sulfitation products are prepared by the general procedures disclosed in U. S. Patents 2,265,993, 2,313,719 and 2,336,387. For example, the nitrosating agent, i. e., a nitrosyl halide (nitrosyl chloride or bromide), or nitrogen tetroxide or trioxide, or a mixture of two or more of these nitrosating agents, is reacted with the unsaturated compounds at relatively low temperatures, e. g., from −20° to 80° C., and preferably from 0° to 40° C. until part or substantially all of the non-aromatic

linkages in the unsaturated compound have reacted, about 1 to 2 mols of the nitrosating agent being added per

group. Sulfitation of the resulting nitrosation mixture is effected by treatment with an aqueous solution of a water-soluble sulfite, e. g., at temperatures of from 60° to 130° C. Suitable sulfites include bisulfites and sulfites of sodium, ammonium or potassium; a mixture of alkali metal sulfite and bisulfite in molecular ratio of 1:1 to 5:1 being preferably employed, and 2½ to 5 mols of sulfites being employed for each nitrosated

linkage. The reaction mixture advantageously contains a water-soluble solvent such as isopropyl alcohol. Preferred details of sulfitation are described in applications Serial Nos. 424,941 (now U. S. Patent 2,373,643) and 424,943 (now U. S. Patent 2,343,362) of L. J. Beckham. Unreacted water-insoluble compounds are removed by decantation and extraction as disclosed in application Serial No. 427,321 of Fessler of January 19, 1942 (now U. S. Patent 2,383,120). Residual organic solvent may be removed by distillation in accordance with application Serial No. 434,578 of Fessler of March 13, 1942 (now U. S. Patent 2,381,658). The solution thus obtained, in addition to surface-active nitrosation-sulfitation products, contains inorganic salts including unreacted sulfites, traces of oil and organic decomposition products formed during nitrosation and sulfitation, the latter including water-soluble organic compounds which do not contribute to the surface-active properties of the composition, as well as colored impurities.

The alcohols employed as solvents in the process of this invention are monohydric alcohols containing 3 to 5 carbon atoms, i. e., propyl, butyl and amyl alcohols, primary, secondary or tertiary. Suitable alcohols range from those which are completely miscible with water (normal propyl, isopropyl and tertiary butyl alcohols) to alcohols which have low miscibility with water (e. g., isoamyl alcohol). Preferably alcohols having a solubility in water of at least 7 parts per 100 parts of water at 30° C. are employed, (e. g., normal propyl and isopropyl alcohol, normal, secondary, and tertiary butyl alcohol, isobutyl alcohol and tertiary amyl alcohol). Of this group, alcohols having limited miscibility with water at 30° C. (e. g., normal and secondary butyl and isobutyl alcohol) are especially preferred, since they are more effective than water-soluble alcohols in eliminating inorganic salts from nitrosation-sulfitation products, while at the same time leading to the recovery of purified organic nitrosation-sulfitation products in high yields. Moreover, water-miscible alcohols such as isopropyl alcohol, as distinguished from those of limited miscibility, sometimes cause separation of a solid phase from a mixture of the alcohol with a nitrosation-sulfitation product, whereby countercurrent operation of the process of the invention is seriously complicated. Formation of a solid phase while using a water-miscible alcohol can be avoided, however, by raising the temperature of treatment, e. g., to about 50° C.

Alcohols of lower solubility in water than 7 parts per 100 parts of water at 30° C., such as isoamyl alcohol, are relatively highly selective, yielding organic nitrosation-sulfitation products of high purity, but they tend to form a third liquid phase with some nitrosation-sulfitation compositions. Formation of a third liquid phase renders operation of the process by countercurrent extraction relatively difficult, requiring more careful control and retarding separation of the phases formed during the treatment. Formation of such a third liquid phase can be avoided, generally, by reducing the concentration of the aqueous nitrosation-sulfitation mixture subjected to treatment (e. g., by dilution with water), by increasing the carbon content thereof (e. g., by separating a portion of the inorganic salts by fractional crystallization), and to a lesser extent by raising the temperature of treatment.

Instead of employing the alcohol alone as the treatment solvent, the alcohol can be diluted with up to an equal amount of a substantially water-immiscible solvent, for example, a liquid aromatic hydrocarbon such as benzene, or a low-boiling paraffinic hydrocarbon mixture such as petroleum naphtha. Use of mixed alcoholic solvents of this type is sometimes useful in the case of water-miscible alcohols. The water-immiscible solvent decreases the solubility of inorganic salts in the alcohol, and thus increases the selectivity of the treatment, and the purity of the products obtained. However, to a lesser extent, the added solvents also reduce the solubility of the organic surface-active components of the nitrosation-sulfitation mixture in the alcoholic phase formed in the treatment, and accordingly reduce the yield. Use of mixed solvents also renders the treatment sensitive to relatively minor variations in operating conditions. Accordingly, it is preferred to use the alcohols specified above without addition thereto of other organic solvents. The alcohols may contain minor amounts of water, e. g., the amounts generally present therein after recovery by distillation thereof from an aqueous mixture.

Temperatures up to the normal boiling point of the azeotrope formed by the alcoholic solvent and water present in the mixture are suitable for carrying out the process of this invention, and temperatures from 25° to 50° C. are preferred. In general, it is unnecessary to supply heat to the materials undergoing treatment by the process of the invention. Use of higher operating temperatures either tends to render the solvent more selective, thus leading to a purer product, or tends to increase the yield. As indicated above, an increase in temperature, e. g., to about 50° C. is sometimes desirable when using a water-soluble alcohol, in order to avoid formation of a solid phase.

The ratio of the amount by weight of the aqueous nitrosation-sulfitation product solution to anhydrous alcoholic solvent can be varied between 0.5:1 and 5:1. Preferably this ratio is substantially between 1:1 and 2.6:1, particularly in countercurrent operation (the ratios being calculated by including any water contained in the alcoholic solvent as part of the aqueous solution). An increase in the aforesaid ratio usually tends to increase the yield but decreases the purity of the nitrosation-sulfitation products contained in the alcohol-rich phase.

The concentration of aqueous solutions of the nitrosation-sulfitation products subjected to treatment according to this invention should be at least 15%, and preferably 25% to 35% by weight of solids, in order to insure recovery of purified organic nitrosation-sulfitation products in satisfactory yields. Aqueous solutions of crude nitrosation-sulfitation products, obtained as described in the previous applications and patents referred to above, are generally relatively concentrated, and can be readily adjusted to a predetermined concentration by dilution with water or evaporation of part of the water already present.

A minimum proportion of inorganic salts is preferably present in the solid components of the nitrosation-sulfitation mixture subjected to the present treatment, in order to render the surface-active organic components of the nitrosation-sulfitation product less soluble in the aqueous phase of the mixture formed upon treatment with the alcoholic solvent, thus providing higher yields. A convenient index of the proportion of inorganic salts in such mixtures is the carbon content of the solids contained in the compositions. Thus, a nitrosation-sulfitation mixture, obtained from a mixture of olefinic petroleum-type hydrocarbons of detergent-forming range (14 to 23 carbon atoms) contains about 50% carbon when substantially all of the inorganic salts have been removed. Accordingly, smaller percentages of carbon indicate the presence of inorganic salts. For efficient recovery of the organic components of nitrosation-sulfitation mixtures of detergent range by treatment according to this invention, the solids contained in such mixtures should contain from about 10% to 35% carbon (as employed herein per cent carbon refers to combined carbon).

In order to insure formation of separate aqueous and alcoholic phases in substantial amounts, as required for efficient operation of the process of the invention, the weight ratio of the amount of water present in the mixture formed during treatment to the inorganic salts therein should not exceed 6:1 when a completely water-miscible alcoholic solvent is employed, and the weight ratio of aqueous nitrosation-sulfitation product to anhydrous alcoholic solvent is about 4:1. When the latter ratio is decreased, or when an alcoholic solvent which is incompletely miscible with water is used, the weight ratio of water to inorganic salts can be correspondingly increased. For example, when an alcoholic solvent which is incompletely miscible with water is used, the weight ratio of water to inorganic salts in the treatment mixture can be increased to 10:1.

In carrying out the present process as a countercurrent operation, either the alcoholic solvent or the nitrosation-sulfitation product solution can constitute the continuous phase, without any significant difference in results. The rate of feed of the liquid introduced into the system is generally adjusted to about 50% to 75% of the maximum non-flooding rate of the apparatus employed.

The process of this invention is illustrated by the following examples, wherein parts, ratios and percentages are by weight and temperatures are in degrees centigrade.

EXAMPLE 1

Part A: Measured amounts of an aqueous nitrosation-sulfitation product solution containing 30% solids, 22.6% of which was carbon (obtained from a fraction of an olefinic hydrocarbon mixture prepared by coil-cracking of topped crude petroleum, boiling from 150° to 275° at 50 mm. of mercury, absolute pressure, and composed mainly of hydrocarbons containing from 14 to 23 carbon atoms per molecule, by successively reacting said fraction with nitrosyl chloride, containing about 5% of nitrogen tetroxide, and an aqueous sodium sulfite solution, and separating unreacted oily materials) were mixed at 25° with measured quantities of anhydrous isopropyl, normal propyl and tertiary butyl alcohol, the ratio of said amounts of nitrosation-sulfitation product solution to said quantities of alcohol being 0.5:1, 1:1 and 2:1. After agitating the resulting mixtures, they were allowed to stand, resulting in separation of two liquid layers, the upper layer constituting an alcohol-rich phase containing most of the surface-active organic nitrosation-sulfitation products, and the lower layer constituting an aqueous phase containing most of the inorganic salts. The alcohol-rich phase was separated and evaporated to dryness, and the residue analyzed to determine the percentage of carbon therein. The yield of organic nitrosation-sulfitation product in the alcohol-rich phase was calculated from the ratio of the total carbon contained in the residue to the total carbon contained in the quantity of nitrosation-sulfitation mixture subjected to treatment. The percentages of carbon in the residue, and the yields are given in the following table:

*Table I*

| Ratio: $\frac{\text{Soln.}}{\text{Alc.}}$ (Solvent) | 0.5:1 | | 1:1 | | 2:1 | |
|---|---|---|---|---|---|---|
| | Percent C | Yield | Percent C | Yield | Percent C | Yield |
| isopropyl acohol | 44.45 | 88.1 | ¹43.53 | 91.4 | 40.80 | 94 |
| n-propyl alcohol | 44.66 | 88.2 | 45.65 | 91.0 | 43.47 | 91.6 |
| tertiary butyl alcohol | 46.31 | 83.9 | 43.80 | 89.8 | 44.86 | 91.8.2 |

¹ A solid phase separated from the mixture.

The various solid purified organic nitrosation-sulfitation products, obtained by the foregoing procedures, were dissolved in water to form solutions containing 0.625 gram of organic carbon per liter. These were compared with a solution of the original nitrosation-sulfitation product having a concentration of 0.625 gram of carbon per liter. It was found that in each instance the solutions of the purified nitrosation-sulfitation products were only 65± 5% as colored as the solution of the original material, i. e., it was necessary to dilute the solution of the original nitrosation-sulfitation product to a concentration of 0.406±0.031 gram of carbon per liter to achieve a solution with a color concentration comparable to those of the purified nitrosation-sulfitation products at 0.625 gram of carbon per liter.

Part B: As indicated in Table I, in one of the extractions with isopropyl alcohol (employing equal amounts of alcohol and nitrosation-sulfitation mixture), a solid phase separated in addition to the two liquid phases. The treatment with isopropyl alcohol was then repeated, replacing 5% of the water contained in the nitrosation-sulfitation product solution, with an equal amount of a petroleum heptane fraction having a boiling range of 86° to 100°. Other conditions of treatment remained the same as set forth above. No separation of a solid phase occurred, and the following results were obtained:

*Table II*

| Ratio: $\frac{\text{Soln.}}{\text{Alc. Solv.}}$ (Solvent) | 0.5:1 | | 1:1 | | 2:1 | |
|---|---|---|---|---|---|---|
| | Percent C | Yield | Percent C | Yield | Percent C | Per cent Yield |
| isopropyl alcohol | 44.40 | 92.2 | 43.61 | 92.4 | 42.71 | 93.4 |

Part C: A quantity of anhydrous isopropyl alcohol was diluted with an equal amount of said petroleum heptane fraction and a portion of the nitrosation-sulfitation product solution was diluted with sufficient water to reduce its concentration from 30% to 25% solids. Measured quantities of the resulting mixed solvent and aqueous solution having a ratio of 1:0.5 were mixed at 25° and worked up in the manner described above. A solid phase was formed despite the partial dilution of the aqueous solution. The following results were obtained in which the nitrosation-sulfitation product solution is designated as "NS Solution":

Table III

| Ratio: Soln./Alc. Solv. (Solvent) | 0.5:1 | | Concentration of NS Solution |
|---|---|---|---|
| | Per cent C | Yield | |
| isopropyl alcohol and petroleum heptane fraction | 48.47 | 86.0 | Percent 25 |

Thus, as compared with isopropyl alcohol alone, a mixture of equal parts of isopropyl alcohol and the petroleum heptane fraction results in a somewhat lower yield of organic nitrosation-sulfitation product, but the carbon content, and hence the purity, of the product is increased.

EXAMPLE 2

Measured quantities of the 30% aqueous nitrosation-sulfitation mixture employed in Example 1 were treated at 25° with measured quantities of anhydrous normal butyl, secondary butyl, isobutyl, and isoamyl alcohols in the manner described in Example 1, part A. The percentages of carbon in the residues obtained by evaporating the alcoholic layers and the yields obtained are set out in the following table:

Table IV

| Ratio: Soln./Alc. Solv. (Solvent) | 0.5:1 | | 1:1 | | 2:1 | |
|---|---|---|---|---|---|---|
| | Per cent C | Yield | Per cent C | Yield | Per cent C | Yield |
| n-butyl alcohol | 49.12 | 83.1 | 47.84 | 84.7 | 46.25 | ¹ |
| secondary butyl alcohol | 50.16 | 74.9 | 48.98 | 79.1 | 47.40 | 85.3 |
| isobutyl alcohol | 52.72 | 67.5 | 51.90 | 62.9 | 50.16 | 70.1 |
| isoamyl alcohol | 51.11 | 74.6 | 48.14 | 79.9 | 45.93 | 87.7 |

No solid phase separated from any of these mixtures.

EXAMPLE 3

Anhydrous tertiary butyl alcohol was mixed with an equal amount of a petroleum heptane fraction having a boiling range of 86° to 100°, and a measured quantity of the 30% nitrosation-sulfitation product solution of Example 1 was mixed at 25° with a measured amount of the resulting solvent mixture, the ratio of aqueous solution to solvent being 0.5:1. This resulted in separation of a solid phase from the mixture. The aqueous nitrosation-sulfitation product solution was then diluted with sufficient water to reduce its concentration to 25% solids. Mixed solvents containing equal amounts, respectively, of tertiary butyl alcohol and the petroleum heptane fraction, and tertiary butyl alcohol and benzene were prepared, and mixed with measured quantities of the 25% nitrosation-sulfitation product solution, the ratio to mixed solvent of solution being in each case 0.5:1. No solid phase was formed in either case. The results of these treatments are given in the following table:

Table V

| Ratio: Soln./Alc. Solv. (Solvent) | 0.5:1 | | Concentration of NS Solution |
|---|---|---|---|
| | Per cent C | Yield | |
| Tertiary butyl alcohol and Petroleum heptane fraction | ¹ 48.66 | 69.4 | Per cent 30 |
| Tertiary butyl alcohol and Petroleum heptane fraction | 51.79 | 56.1 | 25 |
| Tertiary butyl alcohol and benzene | 50.59 | 75.3 | 25 |

¹ A solid phase separated from the mixture.

The first two sets of results illustrate the effect of diluting the nitrosation-sulfitation product solution with water so as to lower its concentration to eliminate formation of a solid phase, and to increase elimination of inorganic salts at the expense of a reduction in yield. Comparison of the last set of results with the others indicates that benzene is superior to Skellysolve C as a diluent for a water-soluble alcohol such as tertiary butyl alcohol, leading to a substantially higher yield of purified nitrosation-sulfitation product without substantial decrease in the carbon content of the product.

EXAMPLE 4

An aqueous nitrosation-sulfitation product having a carbon content amounting to 19.26% of the solids contained therein, obtained from cracked petroleum in the same manner as the product of Example 1, except that the olefinic hydrocarbon mixture employed as starting material was subjected to preliminary selective solvent extraction with furfural before nitrosation as disclosed and claimed in copending application Serial No. 505,960, filed October 12, 1943, of L. J. Beckham and W. A. Fessler, was made up into aqueous solutions containing 30%, 25% and 20% solids, respectively. Measured quantities of these solutions were treated as described in Example 1 (part A) at 25° with a series of anhydrous alcoholic extraction solvents, the ratio of solution to solvent being 1:1. Further portions of the 25% nitrosation-sulfitation product solution were similarly treated with the same series of solvents except that a temperature of 50° was maintained. Finally, measured portions of the 25% aqueous solution were treated at 25° with the same series of solvents, except that the ratio of solution to solvent was 2:1 instead of 1:1. The results in terms of yield and the percentage of carbon in the solid product obtained from the alcohol-rich phase of the resulting mixtures are given in the following table in which the nitrosation-sulfitation product solution is designated as "NS Solution":

Table VI

| Temperature | 25° | | | | | | 50° | | 25° | |
|---|---|---|---|---|---|---|---|---|---|---|
| Concentration of NS Solution | 30% | | 25% | | 20% | | 25% | | 25% | |
| Ratio: Soln./Alc. Solv. | 1:1 | | 1:1 | | 1:1 | | 1:1 | | 2:1 | |
| Solvent | Per cent C | Yield | Per cent C | Yield | Per cent C | Yield | Per cent C | Yield | Per cent C | Yield |
| isopropyl alcohol | 40.93 | 93.4 | 40.28 | 96.2 | 37.02 | 95.4 | 40.22 | 93.5 | 39.01 | 92.2 |
| n-propyl alcohol | 45.74 | 87.5 | 44.75 | 96.5 | | | 43.28 | 90.4 | 43.83 | 86.8 |
| tertiary butyl alcohol | 44.70 | 83.9 | 44.75 | 90.0 | | | 46.15 | 89.1 | 45.90 | 88.3 |
| secondary butyl alcohol | 44.43 | 74.1 | 49.23 | 77.6 | | | 49.78 | 78.5 | 42.45 | 89.5 |
| n-butyl alcohol | 46.12 | 82.2 | 48.61 | 82.8 | | | 49.67 | 90.6 | 54.20 | 85.8 |
| isobutyl alcohol | 50.38 | 57.0 | 50.59 | 64.0 | 52.77 | 66.6 | 51.71 | 70.4 | 50.29 | 61.8 |
| tertiary butyl alcohol and Skellysolve C | 44.70 | 83.9 | 43.77 | 80.8 | | | 45.38 | 80.4 | 38.15 | 88.9 |
| tertiary butyl alcohol and benzene | 46.12 | 89.4 | 46.79 | 84.5 | | | 47.06 | 85.4 | 44.43 | 87.8 |
| isopropyl alcohol and benzene | 35.67 | 88.8 | 43.20 | 82.8 | | | 49.28 | 85.0 | 43.55 | 86.8 |

EXAMPLE 5

Aqueous solutions of the nitrosation-sulfitation product employed in Example 4, having concentrations of 25% and 30%, respectively, were subjected, in a series of runs, to countercurrent treatment or extraction at 50° with isopropyl alcohol (containing about 17% water). The treatment was carried out in a column packed with 3- to 4-mesh crushed silica brick for about 6½ feet of its length, having inlets for the extraction solvent and for the solution to be extracted just beyond the lower and upper ends of the packing, respectively, and outlets for the alcohol-rich extract and for the extracted aqueous solution at points spaced (e. g., about one foot) beyond the ends of the packing. An alternate inlet for extraction solvent was provided at an intermediate point in the column, about 4 feet from the aqueous solution inlet. Use of the alternate inlet limited the countercurrent treatment to a 4 foot (instead of a 6½ foot) countercurrent extraction zone. The ratios of the rate of introduction of the alcoholic solvent to that of the aqueous solution introduced into the column (i. e., the feed ratios) were adjusted respectively at 1:1 and at 1:2, in separate runs. Since the alcoholic solvent contained 17% of water, the ratios of anhydrous solvent to the aqueous portion of the mixture were about 1:1.4 and 1:2.6 by weight. The maximum non-flooding feed rate (or flooding velocity) for each feed ratio was determined, and the combined rates of feed of the alcoholic solvent and aqueous solution were adjusted in each run to between 50 and 75% of the maximum non-flooding feed rate. The phase boundary was maintained in each case below the packing, so that the isopropyl alcohol constituted the continuous phase in the countercurrent treatment zone. The alcoholic extract phase (containing most of the organic surface-active components of the nitrosation-sulfitation product) and the residual aqueous solution (containing most of the inorganic salts) issuing from the column were separately collected. Samples of the alcoholic extract phase and of the residual aqueous solution were evaporated to dryness, and the percent carbon content of the solid residue obtained from each was determined. The yield, i. e., the proportion, of organic nitrosation-sulfitation products, originally present, which were recovered in the alcoholic extract phase, was calculated from the aforesaid percentages of carbon and the percent carbon in the solids of the original nitrosation-sulfitation mixture (which, as set out in Example 4, amounted to 19.26%) in accordance with the following formula:

$$\text{Yield (in \% of theory)} = 100 \times \frac{B}{A} \times \left(\frac{A-C}{B-C}\right)$$

wherein A=percent carbon in the original nitrosation-sulfitation product; B=percent carbon in the solids contained in the extract; and C=percent carbon in the residual solids remaining in the extracted solution.

The results obtained in a series of runs are set forth in the following table:

Table VII

| Soln. Concen. | Temp. | Extn. Zone | Feed ratio Soln./Alc. | Per cent of Flooding Veloc. | Per cent Solids | | Per cent C in Solids | | Per cent Yield |
|---|---|---|---|---|---|---|---|---|---|
| | | | | | Aq. phase | Alc. phase | Aq. phase | Alc. phase | |
| Per cent | Degrees | Feet | | | | | | | |
| 30 | 50 | 4 | 1:1 | 74 | 36.45 | 10.2 | 3.0 | 40.75 | 91.2 |
| 30 | 50 | 6½ | 1:1 | 52 | 37.55 | 10.6 | 1.77 | 41.88 | 94.8 |
| 25 | 50 | 6½ | 1:1 | 75 | 42.6 | 7.45 | 2.59 | 38.06 | 92.8 |
| 30 | 50 | 6½ | 2:1 | 75 | 36.8 | 12.15 | 2.73 | 40.63 | 92.0 |
| 25 | 50 | 6½ | 2:1 | 75 | 39.1 | 13.05 | 2.17 | 30.32 | 95.4 |

EXAMPLE 6

The aqueous nitrosation-sulfitation product solution of the preceding example was subjected to countercurrent extraction in a series of runs with isobutyl alcohol (containing 14% water) in the apparatus described in Example 5. The temperature was varied between 25° and 60°. By use of the alternate solvent inlets of the column, the countercurrent treatment was carried out in a countercurrent zone of 6½ feet or 4 feet. The ratios of the feed rate of the alcohol to that of the aqueous solution were adjusted at 1:1 or 1:2 (corresponding to a weight ratio of anhydrous solvent to aqueous solution of about 1:1.3 or 1:2.5) and the combined feed rates were maintained between 40% and 67% of the maximum non-flooding rate. The phase boundary was maintained below the countercurrent zone as in Example 5. The aqueous and alcoholic solutions issuing from the column were separately collected. Samples of each were distilled to remove the alcohol contained therein, and the percentage of alcohol in the samples determined. As in the preceding example, samples of the two solutions were evaporated to dryness. The carbon content of the solid residues was determined and the yield of organic nitrosation-sulfitation products in the alcoholic phase was calculated therefrom. The results obtained are set out in the following table.

weight ratios of anhydrous alcohol to aqueous solution of about 1:1.3, 1:2.4 and 1:4.7), a temperature of 27° to 28° was maintained, and the phase boundary was maintained below the countercurrent extraction zone. The solutions issuing from the column were worked up as in the preceding example. The results obtained were as follows:

Table IX

| Soln. Concen. | Temp. | Feed Ratio Soln./Alc. | Per cent of Flooding Veloc. | Per cent Solids | | Per cent Solvent | | Per cent C in Solids | | Per cent Yield |
|---|---|---|---|---|---|---|---|---|---|---|
| | | | | Aq. phase | Alc. phase | Aq. phase | Alc. phase | Aq. phase | Alc. phase | |
| Per cent | Degrees | | | | | | | | | |
| 25.12 | 28 | 1:1 | 42 | 30.6 | 6.45 | 1.2 | 59.3 | 3.38 | 43.33 | 90.7 |
| 25.12 | 28 | 1:1 | 62 | 29.35 | 6.9 | 1.8 | 59.5 | 3.25 | 43.72 | 91.1 |
| 25.12 | 28 | 2:1 | 50 | 25.55 | 10.1 | 2.1 | 50.8 | 3.17 | 42.95 | 91.4 |
| 25.12 | 27 | 4:1 | 50 | 22.7 | 20.55 | | 21.0 | 4.91 | 31.38 | 90.4 |

Similar results were obtained in two additional extraction runs in which the phase boundary was maintained at the top of the countercurrent zone, so that the aqueous phase constituted the continuous phase therein. The results of these runs are given in the following table.

Table X

| Soln. Concen. | Temp. | Feed Ratio Soln./Alc. | Per cent of Flooding Veloc. | Per cent Solids | | Per cent Solvent | | Per cent C in Solids | | Per cent Yield |
|---|---|---|---|---|---|---|---|---|---|---|
| | | | | Aq. phase | Alc. phase | Aq. phase | Alc. phase | Aq. phase | Alc. phase | |
| Per cent | Degrees | | | | | | | | | |
| 25.12 | 28 | 1:1 | 50 | 26.9 | 5.15 | 1.0 | 60.5 | 2.76 | 43.61 | 93.0 |
| 25.12 | 26 | 1:1 | 75 | 34.5 | 5.1 | 0.8 | 62.6 | 2.81 | 43.36 | 92.4 |

EXAMPLE 8

A nitrosation-sulfitation product obtained as

Table VIII

| Soln. Concen. | Temp. | Extn. Zone | Feed Ratio Soln./Alc. | Per cent of Flooding Veloc. | Per cent Solids | | Per cent Solvent | | Per cent C in Solids | | Per cent Yield |
|---|---|---|---|---|---|---|---|---|---|---|---|
| | | | | | Aq. phase | Alc. phase | Aq. phase | Alc. phase | Aq. phase | Alc. phase | |
| Per cent | Degrees | Feet | | | | | | | | | |
| 30 | 25 | 6½ | 1:1 | 57 | 24.5 | 7.95 | 2.90 | 81.2 | 7.65 | 51.09 | 71.0 |
| 30 | 25 | 6½ | 2:1 | 50 | 25.95 | 12.15 | 2.10 | 69.9 | 8.65 | 49.84 | 66.7 |
| 30 | 50 | 6½ | 1:1 | 50 | 24.2 | 8.35 | 1.20 | 75.9 | 5.63 | 49.61 | 79.8 |
| 30 | 50 | 6½ | 2:1 | 40 | 24.85 | 13.8 | 1.6 | 66.4 | 6.79 | 48.98 | 75.5 |
| 25 | 32 | 6½ | 1:1 | 50 | 19.65 | 8.1 | 1.35 | 74.4 | 6.67 | 51.74 | 75.2 |
| 25 | 33 | 6½ | 2:1 | 67 | 20.25 | 9.6 | 2.75 | 71.7 | 9.07 | 51.22 | 61.4 |
| 25 | 60 | 6½ | 1:1 | 60 | 21.25 | 8.55 | 1.6 | 73.9 | 5.07 | 51.00 | 81.8 |
| 25 | 60 | 6½ | 1:1 | 67 | 21.25 | 12.1 | 1.9 | 67.0 | 5.82 | 49.64 | 79.2 |
| 30 | 27 | 4 | 1:1 | 57 | 21.7 | 7.2 | 2.0 | 78.0 | 9.30 | 50.15 | 65.5 |
| 25 | 32 | 4 | 1:1 | 50 | 19.75 | 7.65 | 2.9 | 76.1 | 7.66 | 50.09 | 71.1 |
| 30 | 43 | 4 | 1:1 | ------ | 25.5 | 8.2 | 2.0 | 76.2 | 6.59 | 50.93 | 75.4 |

EXAMPLE 7

A nitrosation-sulfitation product obtained like the product treated in Examples 4 to 6, by nitrosation and sulfitation of a furfural-extracted cracked topped crude petroleum, said product containing 25.12% of solids having a carbon content of 20.69%, was extracted in a series of runs with tertiary butyl alcohol (containing 12% of water) in the apparatus employed in Example 5 with a 6½ foot extraction zone. The ratios of the feed rate of the alcohol to that of the aqueous solution were 1:1, 1:2 or 1:4 (corresponding to in the preceding example from a furfural-extracted cracked topped crude petroleum, said product containing 26.6% solids having a carbon content of 20.36%, was extracted in a series of runs, in the same manner as in the preceding example, with a mixture of equal parts of anhydrous tertiary butyl alcohol (100%) and the petroleum heptane fraction. The ratios of the feed rates of the alcoholic solvent to that of the aqueous solution were 1:1, 1:2, or 1:4, and a temperature of 25° was maintained, the phase boundary being below the countercurrent zone. The results obtained were as follows:

Table XI

| Soln. Concen. | Temp. | Feed Ratio Soln./Alc. | Per cent of Flooding Veloc. | Per cent Solids | | Per cent C in Solids | | Per cent Yield |
|---|---|---|---|---|---|---|---|---|
| | | | | Aq. phase | Alc. phase | Aq. phase | Alc. phase | |
| Per cent | Degrees | | | | | | | |
| 26.6 | 24 | 1:1 | 50 | 22.3 | 6.55 | 6.63 | 39.90 | 81.2 |
| 26.6 | 25 | 1:1 | 75 | 21.65 | 9.85 | 6.00 | 33.29 | 84.5 |
| 26.6 | 25 | 2:1 | 50 | 22.0 | 10.7 | 6.39 | 40.47 | 82.3 |
| 26.6 | 25 | 4:1 | 50 | 21.95 | 7.35 | 5.98 | 44.86 | 81.6 |

Similar results were obtained in two additional extraction runs in which the phase boundary was maintained at the top of the countercurrent zone, so that the aqueous phase constituted the continuous phase therein. The results of these runs are given in the following table:

| Soln. Concen. | Temp. | Feed Ratio Soln./Alc. | Per cent of Flooding Veloc. | Per cent Solids | | Per cent C in Solids | | Per cent Yield |
|---|---|---|---|---|---|---|---|---|
| | | | | Aq. phase | Alc. phase | Aq. phase | Alc. phase | |
| Per cent | Degrees | | | | | | | |
| 26.6 | 25 | 1:1 | 50 | 23.15 | 6.05 | 6.14 | 38.26 | 83.4 |
| 26.6 | 25 | 1:1 | 75 | 23.8 | 7.2 | 5.49 | 39.49 | 85.0 |

The results given in the foregoing examples illustrate the effect of modifying a number of the variables in the process of the invention. Thus, Examples 1 to 4 illustrate the results of single plate extractions, while Examples 5 to 8 illustrate the effect of multiple plate countercurrent extraction in the process of the invention. A comparison of the results obtained by the single plate extraction treatment, given in Example 4, Table 6, with the results of countercurrent extraction given in Example 6, Table 8, indicates that in the case of isobutyl alcohol, the yield of purified organic nitrosation-sulfitation product is substantially increased, while the carbon content thereof is only slightly increased by the multiple plate effect of the countercurrent treatment. In the case of isopropyl alcohol and tertiary butyl alcohol, Examples 4, 5 and 7 (Tables 6, 7, 9 and 10), only minor differences in yield and carbon content are produced by use of a countercurrent procedure instead of a single plate extraction. Similarly, increasing the countercurrent extraction zone from 4 to 6½ feet, in the case of isobutyl alcohol as illustrated in Example 6, Table 8, causes a considerably greater increase in yield (from 63.5% to 71.0%) than in the case of isopropyl alcohol (from 91.2% to 94.8%) illustrated by the data in Example 5, Table 7. The carbon content of the purified products was slightly increased by increasing the extent of the extraction zone in the case of both of these alcohols.

An increase in the ratio of the rate of feed of nitrosation-sulfitation product solution to the rate of feed of alcoholic solvent in the countercurrent extraction from 1:1 to 2:1 has little effect on the yield or carbon content of the product in the case of tertiary butyl alcohol containing 12% of water (Example 7, Table 9). In the case of isobutyl alcohol containing 14% of water (Example 6, Table 8), such modification causes a decrease in yield, and slight decrease in the carbon content of the product. With isopropyl alcohol containing 17% of water (Example 5, Table 7), a similar effect is noted when a 30% aqueous solution of the nitrosation-sulfitation product is used but if the concentration of said solution is reduced to 25%, a substantial decrease in the carbon content of the product results from an increase in the ratio of the amount of aqueous solution to the amount of alcoholic solvent. It has been noted in the case of isobutyl alcohol that an increase in the ratio of aqueous solution to alcoholic solvent causes an increase in the viscosity of the mixture, such that the capacity of the extraction column is substantially reduced; whereas no such decrease in capacity occurs when isopropyl alcohol or tertiary butyl alcohol are used.

Formation of a solid phase upon mixing a nitrosation-sulfitation product solution with a water-miscible alcohol in the process of this invention can be avoided, as set forth above, by increasing the temperature of the mixture, or reducing the concentration of the aqueous solution. Thus it was found that a mixture of equal parts by weight of anhydrous isopropyl alcohol and an aqueous solution of the nitrosation-sulfitation product (containing 19.26% carbon) employed in Example 4, yielded a solid phase at 25° C. when the concentration of the aqueous solution exceeded 31% to 32%, whereas no solid phase was formed at 50° C. with an aqueous solution of higher concentration (e. g., 35%).

Formation of a third liquid phase in the process of the invention, when certain alcohols having limited miscibility with water are used, can be most readily avoided by reducing the concentration of the nitrosation-sulfitation product solution (e. g., by dilution with water), and in some cases by increasing the carbon content of the nitrosation-sulfitation product (e. g., by preliminary removal of the part of the inorganic salts contained therein, as by partial crystallization), or raising the temperature. Thus, a mixture of equal parts of anhydrous isoamyl alcohol and an aqueous solution of the nitrosation-sulfitation product of Example 4 (containing 19.26% carbon) forms a third liquid phase at 25° C. when the concentration of the aqueous solution exceeds 10–15%. An increase in the temperature from 25° to 50° C. does not eliminate the third liquid phase at such concentrations. However, if the carbon content of the nitrosation-sulfitation product is increased to 25%, the third liquid phase is not formed at 25° C., until the concentration of the aqueous solution exceeds 23–24%; and an increase in temperature to 50° C. eliminates the third liquid phase at higher concentrations (e. g., 35%). If the carbon content of the nitrosation-sulfitation product is increased by purification to 50%, no third liquid phase is formed with isoamyl alcohol at 25° C. or 50° C.

when the aqueous solution has a concentration of 35%.

Upon mixing anhydrous isobutyl alcohol with aqueous solutions of the nitrosation-sulfitation product of Example 4, containing 19.26% carbon or 25% carbon, at temperatures from 25° to 50° C., a third liquid phase is formed with solutions having a concentration exceeding 31-35%. The minimum concentration resulting in formation of a third liquid phase is only slightly affected by a change in the carbon content of the nitrosation-sulfitation product or the temperature of the treatment. However, when anhydrous isobutyl alcohol is mixed with an aqueous solution of a purified nitrosation-sulfitation product, having a carbon content of 50%, no third liquid phase is formed at concentrations of 35% or more.

Normal-propyl alcohol, and normal, secondary and tertiary butyl alcohols do not form a solid phase or a third liquid phase with the aforesaid nitrosation-sulfitation product solution at concentrations of 35% and more.

Upon completion of the extraction according to the invention, the alcoholic solvent can be removed from the recovered aqueous and alcohol-rich phases by distillation. In order to avoid the difficulties caused by foaming of the distilland, the distillation can be carried out in an apparatus of the type disclosed in application Serial No. 434,578 of March 13, 1942 (now U. S. Patent 2,381,658), to Fessler, involving distillation of the foaming solution in a column while maintaining a foam-breaking concentration of a solvent such as isobutyl alcohol in the liquid or foam at the top of the column. The aqueous phase as well as the alcohol-rich phase yields substantially an azeotropic mixture of water and the alcohol. When employing the water-miscible alcohols in this process, an azeotropic mixture is recovered containing a sufficiently high concentration of alcohol (e. g., 88%) to permit re-use of the distillate as the extraction solvent in the countercurrent process. In the case of alcohols having limited miscibility with water, e. g., an alcohol such as isobutyl alcohol, the alcohol can be separated by cooling the distillate to 30° C. and removing the non-aqueous layer (which contains about 83% of isobutyl alcohol). The latter is likewise suitable for re-use in the countercurrent process. The aqueous phase of the condensate can be advantageously refluxed to the distilland.

The predominantly aqueous phase of the mixture formed in the process of this invention, containing inorganic salts, includes about 40% of the colored impurities originally present in the nitrosation-sulfitation mixture subjected to treatment according to this invention. Removal of these impurities renders the purified nitrosation-sulfitation products recovered from the alcohol-rich phase much lighter in color. Moreover, the aqueous phase of the mixture contains the organic impurities having low surface-activity.

After distillation of the alcoholic solvent contained in the aqueous phase, the inorganic salts can be recovered therefrom by evaporating to dryness, or concentrating the solution and recovering the salts by fractional crystallization upon cooling. These salts comprise, for example, sodium sulfate, sodium sulfites and sodium chloride and can be employed, if desired, in standardization of nitrosation-sulfitation mixtures.

Upon removal of alcohol from the alcohol-rich phase obtained in the present process, the purified organic surface-active components of the nitrosation-sulfitation mixture are obtained in the form of an aqueous solution. To avoid decomposition on storage or during further treatment thereof, the pH of the solution is adjusted, if need be (by addition of an acid- or an alkaline-reacting material), to a value of 7.5 to 9.0. The solution can be evaporated to dryness, if desired, by drum drying, or marketed in the form of a concentrated aqueous solution. By virtue of removal of the inorganic salts, the solubility in water of the nitrosation-sulfitation mixture is surprisingly increased as shown in the following table, giving the concentration at various temperatures of saturated aqueous solutions of a nitrosation-sulfitation product containing 17.5% carbon, and the corresponding purified composition containing 44.5% carbon.

*Table XIII*

| Temperature | Carbon Content= 17.5% | Carbon Content= 44.5% |
| --- | --- | --- |
| | Per cent | Per cent |
| 15° C | 9 | 53 |
| 25° C | 36 | 56 |
| 50° C | 42 | 61 |
| 90° C | 44 | 64 |

Accordingly, stable aqueous solutions containing 50% of solids can be readily prepared from the purified products obtained in the process of this invention.

In specifying the relative amounts of aqueous nitrosation-sulfitation product solution and of alcoholic solvent in the appended claims, the values for the solvent are in terms of anhydrous components thereof, any water present therein being included in the corresponding amount of aqueous nitrosation-sulfitation product solution.

Variations and modifications may be made in the procedures described above without departing from the scope of the invention. Accordingly the foregoing examples and description illustrate but do not limit the conditions for carrying out the present process.

I claim:

1. A process for purifying a surface-active nitrosation-sulfitation product containing inorganic salts impurities and obtained from an unsaturated organic compound of 10 to 30 carbon atoms having a non-aromatic

linkage, which comprises mixing an aqueous solution of said nitrosation-sulfitation product with a solvent which is incompletely miscible with said solution, containing at least 50% by weight of a monohydric alcohol of 3 to 5 carbon atoms, the amount of said solvent and the ratio of the amount of inorganic salts to water in the resulting mixture being sufficient to insure formation of separate aqueous and alcohol-rich phases, separating the resulting alcohol-rich phase from the aqueous phase of the mixture, and recovering the nitrosation-sulfitation products contained in said alcohol-rich phase.

2. A process for purifying a surface-active nitrosation-sulfitation product containing inorganic salts as impurities and obtained from an olefinic hydrocarbon mixture in which the olefinic hydrocarbons contain 10 to 30 carbon atoms, which comprises mixing an aqueous solution of said nitrosation-sulfitation product having a concentration of at least 15% by weight of solids with a solvent which is incompletely miscible with said solution, containing at least 50% of a monohydric alcohol of 3 to 5 carbon atoms, the amount of said solvent and the ratio of the amount of inorganic salts to water in the resulting mixture being sufficient to insure formation of separate aqueous and alcohol-rich phases, separating the resulting alcohol-rich phase from the aqueous phase of the mixture, and recovering the nitrosation-sulfitation products contained in said alcohol-rich phase.

3. A process for purifying a surface-active nitrosation-sulfitation product containing inorganic salts as impurities and obtained from an olefinic hydrocarbon mixture of petroleum type, in which the olefinic hydrocarbons contain 10 to 30 carbon atoms, which comprises mixing 0.5 to 5 parts by weight of an aqueous solution of said nitrosation-sulfitation product having a concentration of at least 15% by weight of solids with one part by weight of a solvent which is incompletely miscible with said solution, containing at least 50% of a monohydric alcohol of 3 to 5 carbon atoms, the amount of said solvent and the ratio of the amount of inorganic salts to water in the resulting mixture being sufficient to insure formation of separate aqueous and alcohol-rich phases, separating the resulting alcohol-rich phase from the aqueous phase of the mixture, and recovering the nitrosation-sulfitation products contained in said alcohol-rich phase.

4. A process for purifying a nitrosation-sulfitation product containing inorganic salts as impurities and obtained from an olefinic hydrocarbon mixture of the petroleum type, in which the olefinic hydrocarbons contain 14 to 23 carbon atoms, which comprises mixing 0.5 to 5 parts by weight of an aqueous solution of said nitrosation-sulfitation product having a concentration of at least 15% by weight of solids of which 10% to 35% by weight is combined carbon, with one part by weight of an alcohol of 3 to 5 carbon atoms which is incompletely miscible with said solution, the amount of said alcohol and the ratio of the amount of inorganic salts to water in the resulting mixture being sufficient to insure formation of separate aqueous and alcohol-rich phases, and the temperature not exceeding the boiling point of the azeotrope formed by said alcohol and water, separating the resulting alcohol-rich phase from the aqueous phase of the mixture, and recovering the nitrosation-sulfitation products contained in said alcohol-rich phase.

5. A process for purifying a surface-active nitrosation-sulfitation product containing inorganic salts, including sodium sulfite and sodium chloride, and obtained from an olefinic hydrocarbon mixture of the petroleum type, in which the olefinic hydrocarbons contain 14 to 23 carbon atoms, which comprises mixing 1 to 2.6 parts by weight of an aqueous solution of said nitrosation-sulfitation product having a concentration of 25% to 35% by weight of solids of which 10% to 35% by weight is combined carbon, at a temperature of 25° to 50° C., with one part by weight of a monohydric alcohol of 3 to 5 carbon atoms having a minimum solubility in water at 30° C. of 7 parts per 100, said alcohol being incompletely miscible with said solution, the amount of said alcohol and the ratio of the amount of inorganic salts to water in the resulting mixture being sufficient to insure formation of separate aqueous and alcohol-rich phases, separating the resulting alcohol-rich phase from the aqueous phase of the mixture, and recovering the nitrosation-sulfitation products contained in said alcohol-rich phase.

6. A process for purifying a surface-active nitrosation-sulfitation product containing inorganic salts, including sodium sulfite and sodium chloride, and obtained from an olefinic hydrocarbon mixture of the petroleum type in which the olefinic hydrocarbons contain 14 to 23 carbon atoms, which comprises mixing 1 to 2.6 parts by weight of an aqueous solution of said nitrosation-sulfitation product having a concentration of 25% to 35% by weight of solids of which 10% to 35% by weight is combined carbon, at a temperature of about 50° C., with one part by weight of isopropyl alcohol, the amount of said alcohol and the ratio of the amount of inorganic salts to water in the resulting mixture being sufficient to insure formation of separate aqueous and alcohol-rich phases, separating the resulting alcohol-rich phase from the aqueous phase of the mixture, and recovering the nitrosation-sulfitation products contained in said alcohol-rich phase.

7. A process for purifying a surface-active nitrosation-sulfitation product containing inorganic salts, including sodium sulfite and sodium chloride, and obtained from an olefinic hydrocarbon mixture of the petroleum type in which the olefinic hydrocarbons contain 14 to 23 carbon atoms, which comprises mixing 1 to 2.6 parts by weight of an aqueous solution of said nitrosation-sulfitation product having a concentration of 25% to 35% by weight of solids of which 10% to 35% by weight is combined carbon, at a temperature of about 25° to 30° C., with one part by weight of isobutyl alcohol, the amount of said alcohol and the ratio of the amount of inorganic salts to water in the resulting mixture being sufficient to insure formation of separate aqueous and alcohol-rich phases, separating the resulting alcohol-rich phase from the aqueous phase of the mixture, and recovering the nitrosation-sulfitation products contained in said alcohol-rich phase.

8. A process for purifying a surface-active nitrosation-sulfitation product containing inorganic salts, including sodium sulfite and sodium chloride, and obtained from an olefinic hydrocarbon mixture of the petroleum type in which the olefinic hydrocarbons contain 14 to 23 carbon atoms, which comprises mixing 1 to 2.6 parts by weight of an aqueous solution of said nitrosation-sulfitation product having a concentration of 25% to 35% by weight of solids of which 10% to 35% by weight is combined carbon, at a temperature of about 25° to 30° C., with one part by weight of tertiary butyl alcohol, the amount of said alcohol and the ratio of the amount of inorganic salts to water in the resulting mixture being sufficient to insure formation of separate aqueous and alcohol-rich phases, separating the resulting alcohol-rich phase from the aqueous phase of the mixture, and recovering the nitrosation-sulfitation products contained in said alcohol-rich phase.

9. A process for purifying a surface-active nitrosation-sulfitation product containing inorganic salts as impurities and obtained from an olefinic hydrocarbon mixture in which the olefinic hydrocarbons contain 10 to 30 carbon atoms, which comprises subjecting 1 to 5 parts by weight of an aqueous solution of said nitrosation-sulfitation product, having a concentration of at least 15% by weight of solids, to countercurrent extraction with one part by weight of a solvent which is incompletely miscible with said solution, containing at least 50% of monohydric alcohol of 3 to 5 carbon atoms, the amount of said solvent and the ratio of the amount of inorganic salts to water in the resulting mixture being sufficient to insure formation of separate aqueous and alcohol-rich phases, the concentration of said solution being insufficient to form more than two phases in the resulting mixture, and the temperature not exceeding the boiling point of the azeotrope formed by said alcohol and water; separately withdrawing the alcohol-rich phase and the aqueous phase from the countercurrent extraction zone, and recovering nitrosation-sulfitation product contained in said alcohol-rich phase.

10. A process for purifying a surface-active nitrosation-sulfitation product containing inorganic salts, including sodium sulfite and sodium chloride, and obtained from an olefinic hydrocarbon mixture of the petroleum type, in which the olefins contain 14 to 23 carbon atoms, which comprises subjecting 1 to 2.6 parts by weight of an aqueous solution of said nitrosation-sulfitation product having a concentration of at least 15% by weight of solids of which 10% to 35% by weight is combined carbon, to countercurrent extraction at a temperature of 25° to 50° C. with one part by weight of a monohydric alcohol of 3 to 4 carbon atoms which is incompletely miscible with said solution, the amount of said alcohol and the ratio of the amount of inorganic salts to water in the resulting mixture being sufficient to insure formation of separate aqueous and alcohol-rich phases, and the concentration of said solution being insufficient to form more than two phases in the resulting mixture, separately withdrawing the alcohol-rich phase and the aqueous phase from the countercurrent extraction zone, and recovering the nitrosation-sulfitation products contained in said alcohol-rich phase.

11. A process for purifying a surface-active nitrosation-sulfitation product containing inorganic salts, including sodium sulfite and sodium chloride, and obtained from an olefinic hydrocarbon mixture of the petroleum type, in which the olefinic hydrocarbons contain 14 to 23 carbon atoms, which comprises subjecting 1 to 2.6 parts by weight of an aqueous solution of said nitrosation-sulfitation product having a concentration of 25% to 35% by weight of solids of which 10% to 35% by weight is combined carbon, to countercurrent extraction at a temperature of about 50° C. with one part by weight of isopropyl alcohol, the amount of said alcohol and the ratio of the amount of inorganic salts to water in the resulting mixture being sufficient to insure formation of separate aqueous and alcohol-rich phases, and the concentration of said solution being insufficient to form more than two phases in the resulting mixture, separately withdrawing the alcohol-rich phase and the aqueous phase from the countercurrent extraction zone, and recovering the nitrosation-sulfitation products contained in said alcohol-rich phase.

12. A process for purifying a surface-active nitrosation-sulfitation product containing inorganic salts, including sodium sulfite and sodium chloride, and obtained from an olefinic hydrocarbon mixture of the petroleum type, in which the olefinic hydrocarbons contain 14 to 23 carbon atoms, which comprises subjecting 1 to 2.6 parts by weight of an aqueous solution of said nitrosation-sulfitation product having a concentration of 25% to 35% by weight of solids of which 10% to 35% by weight is combined carbon, to countercurrent extraction at a temperature of about 25° to 30° C. with one part by weight of isobutyl alcohol, the amount of said alcohol and the ratio of the amount of inorganic salts to water in the resulting mixture being sufficient to insure formation of separate aqueous and alcohol-rich phases, and the concentration of said solution being insufficient to form more than two liquid phases in the resulting mixture, separately withdrawing the alcohol-rich phase and the aqueous phase from the countercurrent extraction zone, and recovering the nitrosation-sulfitation product contained in said alcohol-rich phase.

13. A process for purifying a surface-active nitrosation-sulfitation product containing inorganic salts, including sodium sulfite and sodium chloride, and obtained from an olefinic hydrocarbon mixture of the petroleum type, in which the olefins contain 14 to 23 carbon atoms, which comprises subjecting 1 to 2.6 parts by weight of an aqueous solution of said nitrosation-sulfitation product having a concentration of 25% to 35% by weight of solids of which 10% to 35% by weight is combined carbon, to countercurrent extraction at a temperature of about 25° to 30° C. with one part by weight of tertiary butyl alcohol, the amount of said alcohol and the ratio of the amount of inorganic salts to water in the resulting mixture being sufficient to insure formation of separate aqueous and alcohol-rich phases, and the concentration of said solution being insufficient to form more than two liquid phases in the resulting mixture, separately withdrawing the alcohol-rich phase and the aqueous phase from the countercurrent extraction zone, and recovering the nitrosation-sulfitation product contained in said alcohol-rich phase.

LELAND JAMES BECKHAM.

REFERENCES CITED

The following references are of record in the file of this patent:

UNITED STATES PATENTS

| Number | Name | Date |
|---|---|---|
| 1,966,187 | Schirm | July 10, 1934 |
| 2,265,993 | Beckham | Dec. 16, 1941 |
| 2,316,719 | Russell | Apr. 13, 1943 |
| 2,336,387 | Beckham | Dec. 7, 1943 |
| 2,383,120 | Fessler | Aug. 21, 1945 |

Certificate of Correction

Patent No. 2,436,243.  February 17, 1948.

LELAND JAMES BECKHAM

It is hereby certified that errors appear in the printed specification of the above numbered patent requiring correction as follows: Column 6, line 71, for the syllable "aqueo" read *aque*; column 10, lines 26 to 29 inclusive, Table I, last column thereof, strike out

| 94 | | 94.6 |
| 91.6 | and insert instead | 91.8 |
| 91.8 | | 91.2 |
| .2 | | | lines 70, 71, and 72, Table II, last column, for "Per cent Yield" read *Yield*; column 11, line 52, Table IV, first column thereof, for "Alc. Solv." read *Alc.*; line 56, last column of table, insert *91.1*; columns 15 and 16, Table VIII, sixth column thereof, third item from bottom, for "21.7" read *24.7*; same table, last column, third item from bottom, for "65.5" read *63.5*; columns 17 and 18, Table XI, sixth column thereof, for "6.55" read *6.65*; line 20, before the table, insert *Table XII*; column 19, line 28, for "carreid" read *carried*; column 20, line 51, claim 1, after the word "salts" insert *as*; and that the said Letters Patent should be read with these corrections therein that the same may conform to the record of the case in the Patent Office.

Signed and sealed this 6th day of July, A. D. 1948.

[SEAL]

THOMAS F. MURPHY,
*Assistant Commissioner of Patents.*